(12) United States Patent
Cartwright

(10) Patent No.: US 12,175,965 B2
(45) Date of Patent: Dec. 24, 2024

(54) METHOD AND APPARATUS FOR NORMALIZING FEATURES EXTRACTED FROM AUDIO DATA FOR SIGNAL RECOGNITION OR MODIFICATION

(71) Applicant: DOLBY LABORATORIES LICENSING CORPORATION, San Francisco, CA (US)

(72) Inventor: Richard J. Cartwright, Killara (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 411 days.

(21) Appl. No.: 17/629,924

(22) PCT Filed: Jul. 25, 2020

(86) PCT No.: PCT/US2020/043632
§ 371 (c)(1),
(2) Date: Jan. 25, 2022

(87) PCT Pub. No.: WO2021/021683
PCT Pub. Date: Feb. 4, 2021

(65) Prior Publication Data
US 2022/0254332 A1    Aug. 11, 2022

Related U.S. Application Data

(60) Provisional application No. 62/950,013, filed on Dec. 18, 2019, provisional application No. 62/880,167, filed on Jul. 30, 2019.

(30) Foreign Application Priority Data

Dec. 18, 2019  (EP) .................................... 19217579

(51) Int. Cl.
*G10L 15/02* (2006.01)
*G10L 15/16* (2006.01)
(Continued)

(52) U.S. Cl.
CPC .............. *G10L 15/02* (2013.01); *G10L 15/16* (2013.01); *G10L 15/22* (2013.01); *G10L 15/30* (2013.01); *G10L 2015/223* (2013.01)

(58) Field of Classification Search
CPC ......... G10L 15/02; G10L 15/16; G10L 15/22; G10L 2015/223; G10L 15/30
See application file for complete search history.

(56) References Cited

U.S. PATENT DOCUMENTS 4,837,828 A  *  6/1989  Watari .................. G10L 15/065
                                                704/E15.009
5,712,956 A  *  1/1998  Yamada .................. G10L 15/20
                                                        704/224
(Continued)

FOREIGN PATENT DOCUMENTS

JP    H5-108099 A    4/1993
JP    H8-508107 A    8/1996
(Continued)

OTHER PUBLICATIONS

Andreas, S. et al."Spatial Diffuseness features for DNN-Based Speech Recognition in Noisy and Reverberant environments" IEEE International Conference on Acoustics, Speech and Signal Processing, Apr. 19, 2015, pp. 4380-4384.
(Continued)

*Primary Examiner* — Eric Yen

(57) ABSTRACT

A feature vector may be extracted from each frame of input digitized microphone audio data. The feature vector may include a power value for each frequency band of a plurality of frequency bands. A feature history data structure, includ-
(Continued)

ing a plurality of feature vectors, may be formed. A normalized feature set that includes a normalized feature data structure may be produced by determining normalized power values for a plurality of frequency bands of each feature vector of the feature history data structure. A signal recognition or modification process may be based, at least in part, on the normalized feature data structure.

23 Claims, 5 Drawing Sheets

(51) Int. Cl.
  *G10L 15/22* (2006.01)
  *G10L 15/30* (2013.01)

(56) References Cited

U.S. PATENT DOCUMENTS

| | | | |
|---|---|---|---|
| 5,764,853 A * | 6/1998 | Watari | G10L 15/20 706/15 |
| 7,856,355 B2 * | 12/2010 | Kim | G10L 25/69 702/69 |
| 9,818,425 B1 | 11/2017 | Ayrapetian | |
| 9,972,339 B1 | 5/2018 | Sundaram | |
| 10,134,425 B1 | 11/2018 | Johnson, Jr. | |
| 10,304,475 B1 * | 5/2019 | Wang | G01S 3/80 |
| 2003/0004720 A1 | 1/2003 | Garudadri | |
| 2007/0179784 A1 | 8/2007 | Thambiratnam | |
| 2008/0069364 A1 * | 3/2008 | Itou | H04R 5/04 381/17 |
| 2009/0177468 A1 * | 7/2009 | Yu | G10L 15/02 704/226 |
| 2014/0207447 A1 | 7/2014 | Jiang | |
| 2016/0099007 A1 | 4/2016 | Alvarez | |
| 2017/0011738 A1 | 1/2017 | Senior | |
| 2017/0200446 A1 | 7/2017 | Cui | |
| 2018/0075860 A1 | 3/2018 | Parada | |
| 2018/0166075 A1 * | 6/2018 | Lee | G10L 15/02 |
| 2018/0330718 A1 | 11/2018 | Hori | |
| 2019/0352862 A1 * | 11/2019 | Sutherland | A01G 20/00 |

FOREIGN PATENT DOCUMENTS

| | | |
|---|---|---|
| JP | H9-258772 A | 10/1997 |
| JP | 2003271190 A | 9/2003 |
| JP | 2007011330 A | 1/2007 |
| JP | 2011002703 A | 1/2011 |
| JP | 2019514045 A | 5/2019 |
| WO | 2017199417 W | 11/2017 |

OTHER PUBLICATIONS

Chanwoo Kim et al: "Power-normalized cepstral coefficients (PNCC) for robust speech recognition", IEEE/ACM Transactions on Audio, Speech, and Language Processing, vol. 24, No. 7, Jul. 1, 2016 (Jul. 1, 2016), pp. 1315-1329.

Eikki Kallasjoki et al: "Estimating Uncertainty to Improve Exemplar-Based Feature Enhancement for Noise Robust Speech Recognition", IEEE/ACM Transactions on Audio, Speech, and Language Processing, Eee, USA, vol. 22, No. 2, Feb. 1, 2014 (Feb. 1, 2014), pp. 368-380.

Jonathan William Dennis: "Sound Event Recognition in Unstructured Environments using Spectrogram Image Processing", Jan. 1, 2014 (Jan. 1, 2014), XP055604914, Retrieved from the Internet: URL:http://www.ntu.edu.sg/home/aseschng/Th esis/JohnDennis PHDThesis2014.pdf [retrieved on Jul. 12, 2019.

Seltzer Michael L et al: An investigation of deep neural networks for noise robust speech recognition11 , ICASSP, IEEE International Conference on -Acoustics, Speech and Signal Processing Proceedings 1999, May 26, 2013, pp. 7398-7402.

* cited by examiner

METHOD AND APPARATUS FOR NORMALIZING FEATURES EXTRACTED FROM AUDIO DATA FOR SIGNAL RECOGNITION OR MODIFICATION

CROSS REFERENCE TO RELATED APPLICATIONS

This application claims priority to U.S. Provisional Patent Application No. 62/880,167, filed 30 Jul. 2019, U.S. Provisional Patent Application No. 62/950,013, filed 18 Dec. 2019, and European patent application No. 19217579.2, filed 18 Dec. 2019, each of which is hereby incorporated by reference in its entirety.

TECHNICAL FIELD

This disclosure pertains to systems and methods for audio signal recognition or modification including but not limited to speech recognition.

BACKGROUND

Devices capable of signal recognition or modification have wide applicability, including but not limited to wakeword detection and other speech recognition processes, speaker recognition processes, language recognition processes, emotion recognition processes, non-speech sound classification processes and noise suppression processes. Although existing systems and methods for implementing audio signal recognition or modification provide benefits, improved systems and methods would be desirable.

NOTATION AND NOMENCLATURE

Herein, we use the expression "smart audio device" to denote a smart device which is either a single purpose audio device or a virtual assistant (e.g., a connected virtual assistant). A single purpose audio device is a device (e.g., a television (TV) or a mobile phone) including or coupled to at least one microphone (and optionally also including or coupled to at least one speaker) and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user configured area.

Herein, a "virtual assistant" (e.g., a connected virtual assistant) is a device (e.g., a smart speaker, a smart display or a voice assistant integrated device) including or coupled to at least one microphone (and optionally also including or coupled to at least one speaker) and which may provide an ability to utilize multiple devices (distinct from the virtual assistant) for applications that are in a sense cloud enabled or otherwise not implemented in or on the virtual assistant itself. Virtual assistants may sometimes work together, e.g., in a very discrete and conditionally defined way. For example, two or more virtual assistants may work together in the sense that one of them, i.e., the one which is most confident that it has heard a wakeword, responds to the word. Connected devices may form a sort of constellation, which may be managed by one main application which may be (or include or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed. The speaker feed may, in some instances, undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X–M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

At least some aspects of the present disclosure may be implemented via one or more methods. Some such methods may optionally involve receiving microphone audio data from a microphone system and digitizing the microphone audio data to produce digitized microphone audio data. Some methods may optionally involve framing the digitized microphone audio data to produces frames of digitized microphone audio data and extracting a feature vector from each frame of the digitized microphone audio data. The feature vector may be, or may include, a power value for each frequency band of a plurality of frequency bands. In some examples, the power value may be a logarithm of power. Some such methods may involve forming a feature history data structure. The feature history data structure may include a plurality of feature vectors.

Some such methods may involve producing a normalized feature set that includes a normalized feature data structure by determining normalized power values for a plurality of frequency bands of each feature vector of the feature history data structure. Some such methods may involve performing a signal recognition or modification process based, at least in part, on the normalized feature data structure.

In some such methods the normalized feature set may optionally comprise a set of cepstral coefficients descriptive of an overall average spectral shape of the normalized feature data structure.

Some implementations may involve determining a mean spectrum representation based on a current frame and at least one previous frame, comprising calculating, for each frequency band of the plurality of frequency bands, an average or weighted average of the power value of the respective frequency band of the current frame and the power value of the respective frequency band of the at least one previous frame, and determining the set of cepstral coefficients based on the mean spectrum representation, wherein producing the normalized feature data structure is based on the mean spectrum representation.

Some implementations according to a first aspect may involve determining a mean broadband level representing the average over all frequency bands of the mean spectrum representation, determining a mean level-independent spectrum representation by subtracting the mean broadband level from the mean spectrum representation, determining a cepstral decomposition of the mean level-independent spectrum representation, and determining the set of cepstral coefficients based on the cepstral decomposition. In some examples, producing the normalized feature data structure comprises smoothing the mean-level independent spectrum and subtracting—from each feature vector of the feature history data structure—the smoothed mean level-independent spectrum and the mean broadband level. Optionally, smoothing the mean-level independent spectrum comprises performing a spectral re-synthesis of the cepstral decomposition.

In some implementations according to a second aspect, the method further comprise determining a cepstral decomposition of the mean spectrum representation or a smoothed version thereof, and determining the set of cepstral coefficients based on the cepstral decomposition. In some examples, producing the normalized feature data structure comprises: subtracting, from each feature vector of the feature history data structure, the mean level-independent spectrum or the smoothed version thereof.

In some implementations according to the first or second aspect, the cepstral decomposition comprises a single digit number of cepstral dnabs and the set of cepstral coefficients corresponds to at least a subset of the cepstral dnabs of the cepstral decomposition, optionally a subset that excludes the first cepstral dnab.

In some examples, the mean spectrum representation is determined as an infinite impulse response (IIR) average based on the current frame and the most recent previous frame. Alternatively, the mean spectrum representation is determined as a finite impulse response (FIR) average based on all frames of the feature history data structure by calculating, for each frequency band of the plurality of frequency bands, a mean of the power values of the respective frequency band of all frames of the feature history data structure.

The signal recognition or modification process may be, or may include, a speech recognition process. In some instances, the speech recognition process may be, or may include, a wakeword recognition process. According to some examples, performing the signal recognition or modification process may involve providing the normalized feature data structure to an acoustic model and determining a phone probability estimate based on output of the acoustic model. The acoustic model may, in some instances, be implemented via a neural network. Alternatively, or additionally, the signal recognition or modification process may involve a speaker recognition process, a language recognition process, an emotion recognition process, a non-speech sound classification process and/or a noise suppression process.

According to some examples, the frequency bands may have equal, or substantially equal, width in a frequency space. The frequency space may, for example, be a Mel-frequency space, a Bark scale or an equivalent rectangular bandwidth scale.

In some examples, producing the normalized feature data structure may involve determining a mean broadband level based on a current frame and a most recent previous frame. For example, producing the normalized feature data structure may involve determining a mean spectrum representation based on the current frame and the most recent previous frame. According to some implementations, producing the normalized feature data structure may involve determining a mean broadband level based on all frames of the feature history data structure. In some instances, producing the normalized feature data structure may involve determining a mean spectrum representation based on all frames of the feature history data structure.

In some implementations, producing the normalized feature data structure may involve determining a confidence weighting factor for each feature. Determining the confidence weighting factor may be based, at least in part, on a noise estimation, a signal-to-noise estimation, an echo prediction, a signal-to-echo ratio prediction, a sound direction estimation and/or a reverberation estimation.

According to some examples, producing the normalized feature set may involve obtaining a mean level-independent spectrum representation. In some examples, producing the normalized feature set may involve performing a cepstral decomposition of the mean level-independent spectrum representation. In some instances, performing the cepstral decomposition may involve applying a decorrelating transform represented by a basis matrix. The basis matrix may, for example, represent a Discrete Sine Transform basis, a Discrete Cosine Transform basis and/or a Karhunen-Loève Transform basis.

Some methods may involve performing a subsequent or concurrent task that is based, at least in part, on the signal recognition or modification process. The subsequent or concurrent task may, for example, involve controlling a speaker to produce a responsive sound, performing an internet search, initiating a telephone call, sending a text message, sending an email message and/or changing a setting of a device.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method described above.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for performing a method as described above.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
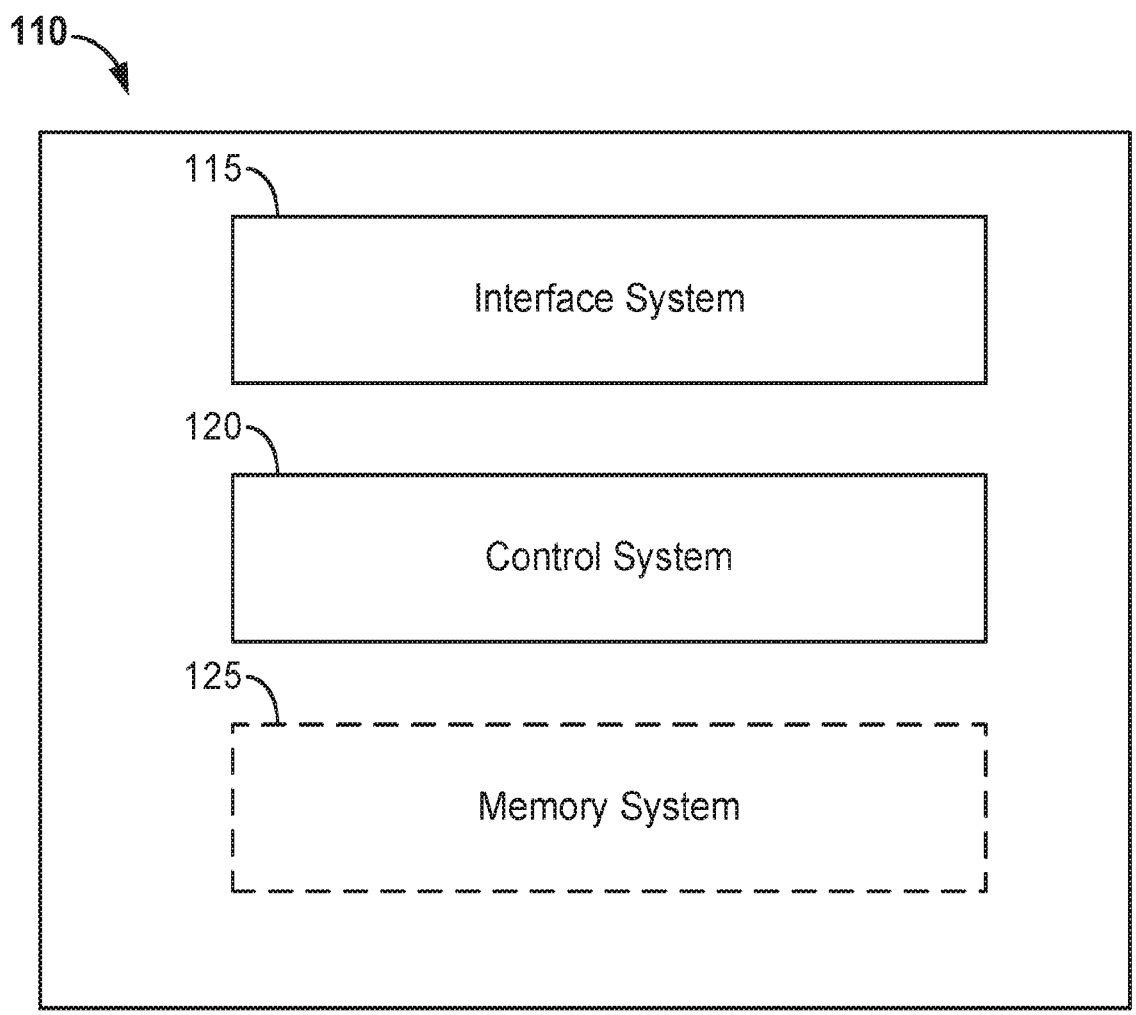
FIG. 1 is a block diagram that shows examples of components of an apparatus capable of implementing various aspects of this disclosure.

Many embodiments of the present disclosure are technologically possible. It will be apparent to those of ordinary skill in the art from the present disclosure how to implement them. Some embodiments of systems and methods are described herein.

Speech analytics systems include wakeword detectors, speech recognizers, speaker recognizers, emotion recognizers, etc. A speech analytics system is often required to work in a wide variety of acoustic conditions and with a wide variety of microphone hardware, neither of which can, in general, be completely characterized when the speech analytics system is designed or trained. Many feature extraction techniques and feature-normalized schemes have been proposed over the years to deal with these issues, such as Mel Frequency Cepstral Coefficient features (MFCCs), fMLLR (feature-space Maximum Likelihood Regression), CMS (Cepstral Mean Subtraction) and CMVN (Cepstral Mean and Variance Normalization).

Although such methods have some advantages, none has proven to be entirely satisfactory. For example, normalization and regression techniques must gather statistics over some period of time before they can function effectively. In the case of speech recognition these techniques often require tens of seconds or minutes of speech before they can be effective. In many speech analytics use cases there is no guarantee that new speech will be uttered under the same acoustic conditions as past speech. In the case of far-field wakeword detection, for example, it would be expected behavior that a previously unheard user may enter the room, stand in a new position unoccupied by any previous speaker and the first word out of his or her mouth may be the wakeword. The device would nonetheless be expected to detect wakewords with low false trigger rates under such circumstances.

Furthermore, if the device detecting the wakeword is a "smart speaker" located in a residential kitchen, for example, it may be expected that the user will frequently move the device during food preparation activities, which may produce a wide range of associated sounds and differing received level and spectrum of a user's speech over time. This means that no two wakeword utterances are likely to be uttered under identical acoustic conditions.

Moreover, unweighted normalization techniques are often sensitive to background noise, such as the sounds associated with food preparation discussed above. MFCC methods often involve dropping the first cepstral coefficient (usually denoted C0), which has the effect of removing from the feature set the unweighted mean of the data in Mel-frequency space. If an estimate of the cepstral mean is heavily affected by background noise, subtracting that cepstral mean will distort all the cepstral coefficients, including those that best represent the desired speech signal.

For many years, speech technology systems worked on the assumption that features representing speech sounds could be modelled as a Gaussian or Gaussian mixture. This restricted system design to the use of feature sets with limited covariance between features. Often an assumption of statistical independence (diagonal covariance) between features was made to make Gaussian Mixture Modelling computationally tractable. Typically MFCCs along with deltas from one time step to the next and delta-deltas were chosen as the feature set, meaning that a classification in which sound was being uttered by a user at any time depended on only three analysis frames in time (typically 30 ms total time history). Since the typical syllable duration in human speech is on the order of 100 ms this often resulted in a poor estimate of which phone was being uttered in speech recognition tasks, for example. In contrast, most modern speech technology systems rely on neural-network-based models of speech. Such models typically have far greater ability to deal with statically dependent (covariant) features than the Gaussian or Gaussian Mixture models of previous times. These systems often "stack up" several analysis frames of features and feed them to the network each frame. Such stacking methods can result in a far more robust estimate of which phone is being spoken (or whether a wakeword was spoken, which speaker was speaking, etc.). A typical case in a modern speech recognizer is that a number (e.g., 23) of "logmelspec" values (that is the log of the power in of a number of spectral bands equally spaced in Mel frequency) is computed every 10 ms and that the most recent 10-20 frames of such features are "stacked up" into an extended 230-460 dimensional feature vector and presented to the network.

Some disclosed implementations provide a novel method for normalization of spectral features that are "stacked up" over multiple analysis frames for input to a neural network speech technology model. Although in some disclosed examples the spectral features are "logmelspec" features, the disclosed methods also apply if the frequency bands for which the powers are calculated are not organized on a Mel scale, but are instead organized in a different manner, e.g., frequency bands that are spaced logarithmically in frequency, frequency bands that are organized according to Bark scale, etc. Some disclosed normalization methods may be capable overcoming at least some of the difficulties discussed above.

Some such normalization methods may involve only normalizing among the features in the stack (e.g., over a 100-200 ms time window). Such methods can be helpful in accurately recognizing speech or detecting wakewords even when a user suddenly begins speaking in never-before-heard acoustic conditions.

Some methods may involve separating macro-scale spectral shape from micro-scale detail. Such methods can be helpful in creating systems that are robust to, for example, microphones with different equalization curves or room impulse responses (RIRs) with different spectral shapes. A system that implements such methods may be relatively more robust to background noise than previous methods.

Some methods may accommodate weighting, such as weighting that is based upon certainty, in the features. A system that implements such methods may be configured to take additional input from pre-processing systems such as echo suppressors, noise suppressors and/or non-linear beamforming systems, which can greatly aid in robustness in some instances.

FIG. 1 is a block diagram that shows examples of components of an apparatus capable of implementing various aspects of this disclosure. According to some examples, the apparatus 110 may be, or may include, a smart audio device that is configured for performing at least some of the methods disclosed herein. The smart audio device may, for example, be a virtual assistant that includes a wakeword detector. In other implementations, the apparatus 110 may be, or may include, another device that is configured for performing at least some of the methods disclosed herein, such as a laptop or desktop computer, a mobile device such as a cell phone or a tablet, etc. In some such implementations the apparatus 110 may be, or may include, a server.

In this example, the apparatus 110 includes an interface system 115 and a control system 120. The interface system 115 may, in some implementations, be configured for receiving input from a microphone system that includes one or more microphones.

The interface system 115 may include one or more network interfaces and/or one or more external device interfaces (such as one or more universal serial bus (USB) interfaces). According to some implementations, the interface system 115 may include one or more wireless interfaces. The interface system 115 may include one or more devices for implementing a user interface, such as one or more microphones, one or more speakers, a display system, a touch sensor system and/or a gesture sensor system. In some examples, the interface system 115 may include one or more interfaces between the control system 120 and a memory system, such as the optional memory system 125 shown in FIG. 1. However, in some instances the control system 120 may include a memory system.

The control system 120 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 120 may reside in more than one device. For example, a portion of the control system 120 may reside in the apparatus 110 and another portion of the control system 120 may reside in another device, such as a server, a smart audio device, a mobile device (e.g., a smartphone or a tablet computer), etc. The interface system 115 also may, in some such examples, reside in more than one device. Accordingly, in some implementations the apparatus 100 may be one of a plurality of devices that are used to implement one or more cloud-based services for implementing aspects of the present disclosure, including but not limited to cloud-based speech recognition services.

In some implementations, the control system 120 may be configured for performing, at least in part, the methods disclosed herein. According to some examples, the control system 120 may be configured for performing a signal recognition or modification process, e.g., such as one or more of those disclosed herein. In some such examples, the control system 120 may be configured for performing a speech recognition process. The speech recognition process may, for example, involve a wakeword recognition process.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 125 shown in FIG. 1 and/or in the control system 120. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 120 of FIG. 1.

Figure 2:
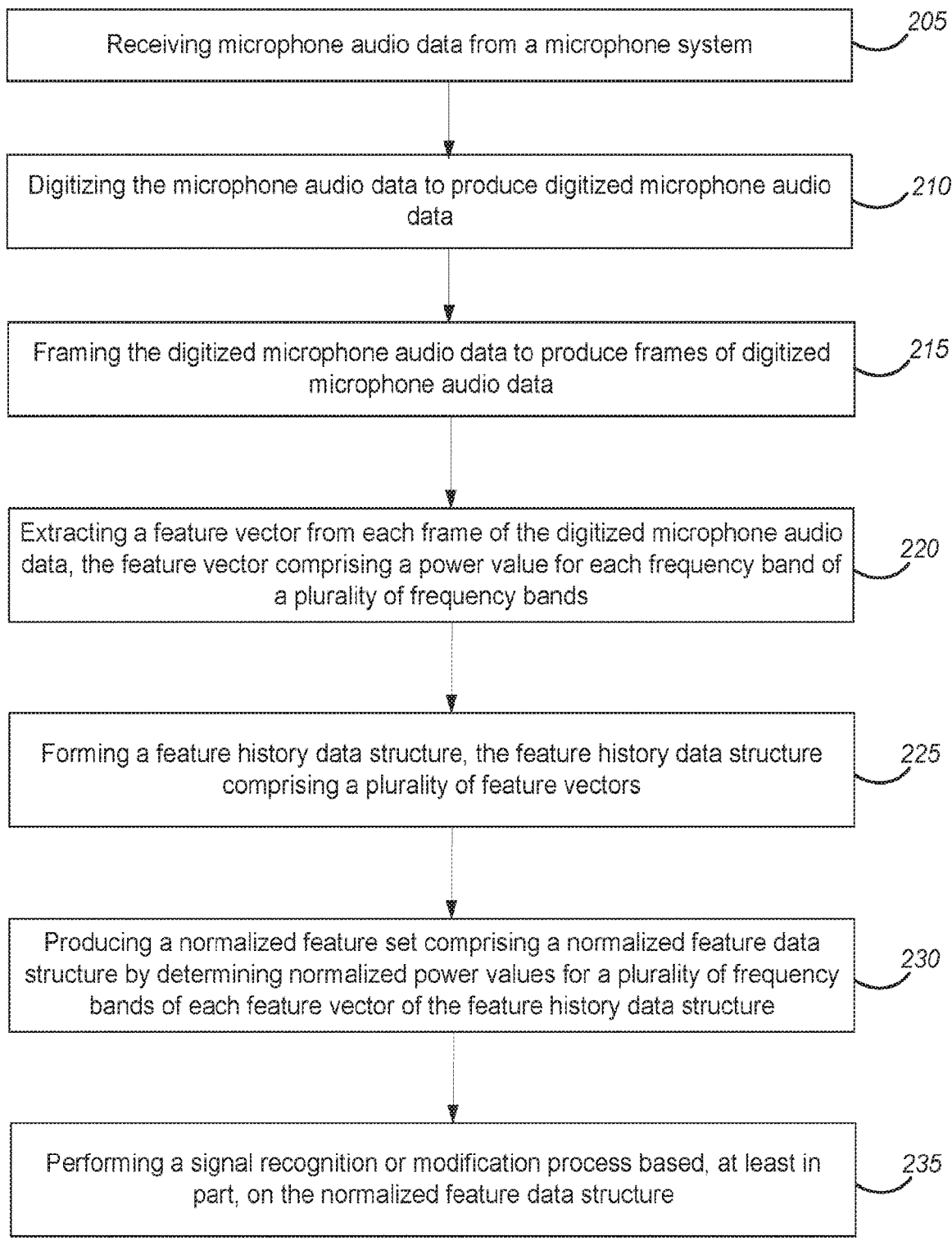
FIG. 2 is a flow diagram that outlines one example of a method that may be performed by an apparatus such as that shown in FIG. 1.

FIG. 2 is a flow diagram that outlines one example of a method that may be performed by an apparatus such as that shown in FIG. 1. The blocks of method 200, like other methods described herein, are not necessarily performed in the order indicated. Moreover, such methods may include more or fewer blocks than shown and/or described.

In this example, block 205 involves receiving microphone audio data from a microphone system. According to some such examples, all of the microphones of the microphone system are part of an apparatus that is performing the method 200, e.g., the apparatus 110. However, in some implementations, the apparatus that is performing the method 200 may not include at least a portion of the microphone system. In some such examples, the microphone system may include one or more microphones that reside in one or more other locations of an environment, e.g., in one or more other devices of the environment.

According to this example, block 205 involves receiving analog microphone audio data and block 210 involves digitizing the microphone audio data to produce digitized microphone audio data. However, in alternative implementations method 200 may involve receiving digitized microphone audio data as an initial block of the process.

Similarly, in this example block 215 involves framing the digitized microphone audio data to produce frames of digitized microphone audio data. According to some implementations, a step size may be 10 ms. In such examples a new frame of logmelspec features is computed every 10 ms. Other implementations may use longer or shorter step sizes. For example, some implementations may have a step size of 5 ms, 15 ms, 20 ms, 25 ms, 30 ms, etc. To compute logmelspec features using a step size of 10 ms, in some examples 20 ms of input microphone audio data may be used, with a 50% overlap in the transform. Alternative implementations may use a longer or shorter overlap. For example, in some implementations 30 ms, 40 ms, 50 ms, 60 ms, 70 ms, 80 ms, 90 ms or 100 ms of input microphone audio data may be used to compute each 10 ms frame. Some systems may choose to use a step size which works out to be a convenient power-of-two count of input microphone audio data samples, because this can lead to an efficient transform implementation using the FFT. For example, some implementations may use 256 input samples at Fs=16 kHz (16 ms) or 128 input samples (8 ms). Some alternative implementations may use 256 input samples or 512 input samples at Fs=32 kHz. However, in alternative implementations method 200 may involve receiving frames of digitized microphone audio data as an initial block of the process.

According to this example, block 220 involves extracting a feature vector from each frame of the digitized microphone audio data. In this example, the feature vector includes a power value for each frequency band of a plurality of frequency bands. Accordingly, in some examples block 220 (or a previous block, such as block 215) may involve transforming the digitized microphone audio data from the time domain to a plurality of frequency bands in a frequency domain. In some examples, the feature vector may include 15, 20, 25, 30, 40, 45 or 50 values.

In some examples, the frequency bands may have equal, or substantially equal, width in a frequency space. The frequency space may, for example, be a Mel-frequency space, a Bark scale or an equivalent rectangular bandwidth scale. The power value may, for example, be a logarithm of power. According to some examples, the logarithmic representation is decibels.

In this implementation, block 225 involves forming a feature history data structure. Block 225 may involve a process of "stacking" feature vectors. In this example, the feature history data structure includes a plurality of feature vectors. In some such examples, there may be 5, 10, 15, 20, 25, 30 or more feature vectors. According to some implementations, the feature history data structure may include feature vectors having a total time duration of 100 ms to 200 ms. For example, some such implementations having a 10 ms step size may include between 10 and 20 frames of feature vectors in the feature history data structure. Some such implementations having a 20 ms step size may include between 5 and 10 frames of feature vectors in the feature history data structure. Creating a feature history data structure that includes feature vectors having a total time duration of 100 ms to 200 ms can be advantageous for speech-related tasks, at least in part because the mean syllable rate for speech is about one syllable every 100 ms. Therefore, a total time duration of 100 ms to 200 ms can be a good choice for an implementation that involves recognizing phones or syllables. Longer or shorter total time durations may be appropriate for implementations that involve recognizing non-speech sounds, recognizing whole words, etc.

According to this implementation, block 230 involves producing a normalized feature set that includes a normalized feature data structure. In this example, block 230 involves determining normalized power values for a plurality of frequency bands of each feature vector of the feature history data structure.

According to some examples, block 230 may involve obtaining a mean level-independent spectrum representation or a mean spectrum representation. In some such examples, block 230 may involve performing a cepstral decomposition of the mean level-independent spectrum representation or the mean spectrum representation. According to some such examples, the normalized feature set may include a set of coefficients corresponding to an overall average spectral shape of the normalized feature data structure. The set of coefficients may, for example, be based at least in part on the cepstral decomposition.

In the example shown in FIG. 2, block 235 involves performing a signal recognition or modification process based, at least in part, on the normalized feature data structure produced in block 230. In some instances, the signal recognition or modification process may involve a speech recognition process. In some such examples, the speech recognition process may be a wakeword recognition process.

According to some implementations, performing the signal recognition or modification process may involve providing the normalized feature data structure to an acoustic model and determining a phone probability estimate based on output of the acoustic model. In some examples, the acoustic model may be implemented via a neural network.

Alternatively, or additionally, performing the signal recognition or modification process may involve processes other than a speech recognition process. For example, performing the signal recognition or modification process may involve a speaker recognition process, a language recognition process, an emotion recognition process, a non-speech sound classification process and/or a noise suppression process.

In some implementations, method 200 may involve performing at least one subsequent task that is based, at least in part, on the signal recognition or modification process. According to some such implementations, the subsequent task may involve controlling a speaker to produce a responsive sound, performing an internet search, initiating a telephone call, sending a text message, sending an email message and/or changing a setting of a device (e.g., a television setting, a speaker setting, a thermostat setting, a home security system setting, a home appliance setting, a heating or air conditioning setting, etc.).

Figure 3A:
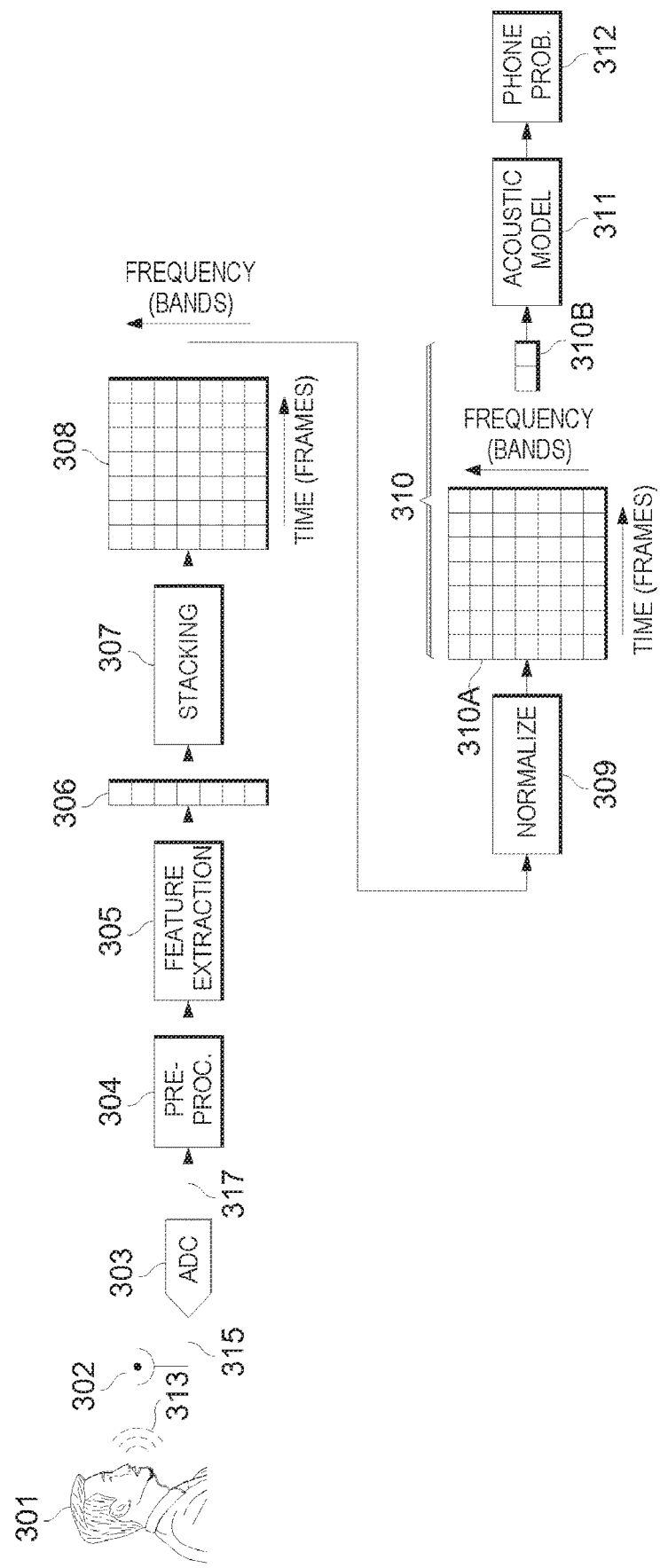
FIG. 3A shows blocks of a system that may be used to implement some aspects of the present disclosure.

FIG. 3A shows blocks of a system that may be used to implement some aspects of the present disclosure. Blocks 303, 304, 305, 307, 309 and 311 of FIG. 3A may, for example, be implemented via a control system, such as the control system 120 that is described above with reference to FIG. 1.

In this example, a talker 301 is making utterances 313 that are picked up by a microphone system 302. A talker may sometimes be referred to herein as a "speaker." The microphone system 302 may include a single microphone or an array of 2 or more microphones, depending on the particular implementations.

In this example, the microphone system 302 provides analog microphone audio data to analog-to-digital converter 303. This is an example of block 205 of FIG. 2. The analog-to-digital converter 303 is configured to digitize the analog microphone audio data to produce digitized microphone audio data. This is an example of block 210 of FIG. 2.

According to this example, the digitized microphone audio data is provided to the digital pre-processing unit 304. Either the analog-to-digital converter 303 or the digital pre-processing unit 304 may be configured to frame the digitized microphone audio data to produce frames of digitized microphone audio data (block 215). The digital pre-processing unit 304 may be configured to provide one or more types of audio pre-processing, such as echo suppression, noise suppression, beam-forming, etc.

In this example, the feature extraction block 305 is configured to extract a feature vector from each frame of the digitized microphone audio data that is output from the digital pre-processing unit 304. This is an example of block 220 of FIG. 2. The feature vector may be, or may include, a power value for each frequency band of a plurality of frequency bands. In some examples, the feature extraction block 305 may be configured to converted pulse-code modulation (PCM) data into "logmelspec" data. For example, the feature extraction block 305 may be configured to compute, at a time interval, the log of power in each of a plurality of frequency bands of equal width in Mel-frequency space. In some examples, the time interval may be 6 ms, 8 ms, 10 ms, 12 ms, 14 ms, etc. According to some examples, the number of frequency bands may be 8, 10, 12, 16, 18, 20, 22, 24, 25, 26, 28, 30, 40, 45, 50 etc.

Block 306 depicts a feature vector that is produced by the feature extraction block 305 from a frame of the digitized microphone audio data that is output from the digital pre-processing unit 304. In one example, the feature vector 306 includes 25 real numbers. In alternative examples, the feature vector 306 may include more or fewer real numbers, e.g., 15, 20, 30, 35, etc.

According to this implementation, the stacking unit 307 has a history buffer and is configured to store or "stack up" multiple feature vectors into a 2-dimensional array 308 of features in time and frequency. The array 308 is an example of the feature history data structure that is formed in block 225 of FIG. 2. In one non-limiting example, every 10 ms a new 25-band feature vector 306 may be computed by the feature extraction block 305. In one such example, the stacking unit 307 keeps the most recent 10 feature vectors 306 so that the output of the stacking unit 307 is a 25 (in frequency) by 10 (in time) array 308 of feature history.

In this example, the array 308 is provided to the normalization block 309. In some examples, the normalization block 309 may be configured to produce a normalized feature set 310 by determining normalized power values for a plurality of frequency bands of each feature vector 306 of the array 308. Some detailed examples of the normalization block 309 are described below. In this example, the normalized feature set 310 includes a two-dimensional array (or "stack") 310A of normalized features. This array 310A will, in some implementations, have the same size as the array 308. According to this example, the normalized feature set 310 also includes cepstral features 310B, which describe the overall average spectral shape of the array 310A. In this example, the cepstral features 310B include only 2 real numbers. In various examples, the number of cepstral features 310B is much smaller than the number of values of the array 310A.

In this example, the normalized feature set 310 is provided to an acoustic model 311, which may in some instances be implemented via a neural network such as a Deep Neural Network (DNN), a Convolutional Neural Network (CNN) or a Recurrent Neural Network (RNN). The acoustic model 311 may, in some examples, be configured for speech recognition. The acoustic model 311 will, in some such examples, have one input for each real value in the normalized feature set 310 and have one output for each phone or senone probability that it models. FIG. 3A shows an example of a phone probability estimate 312 produced by the acoustic model 311.

Figure 3B:
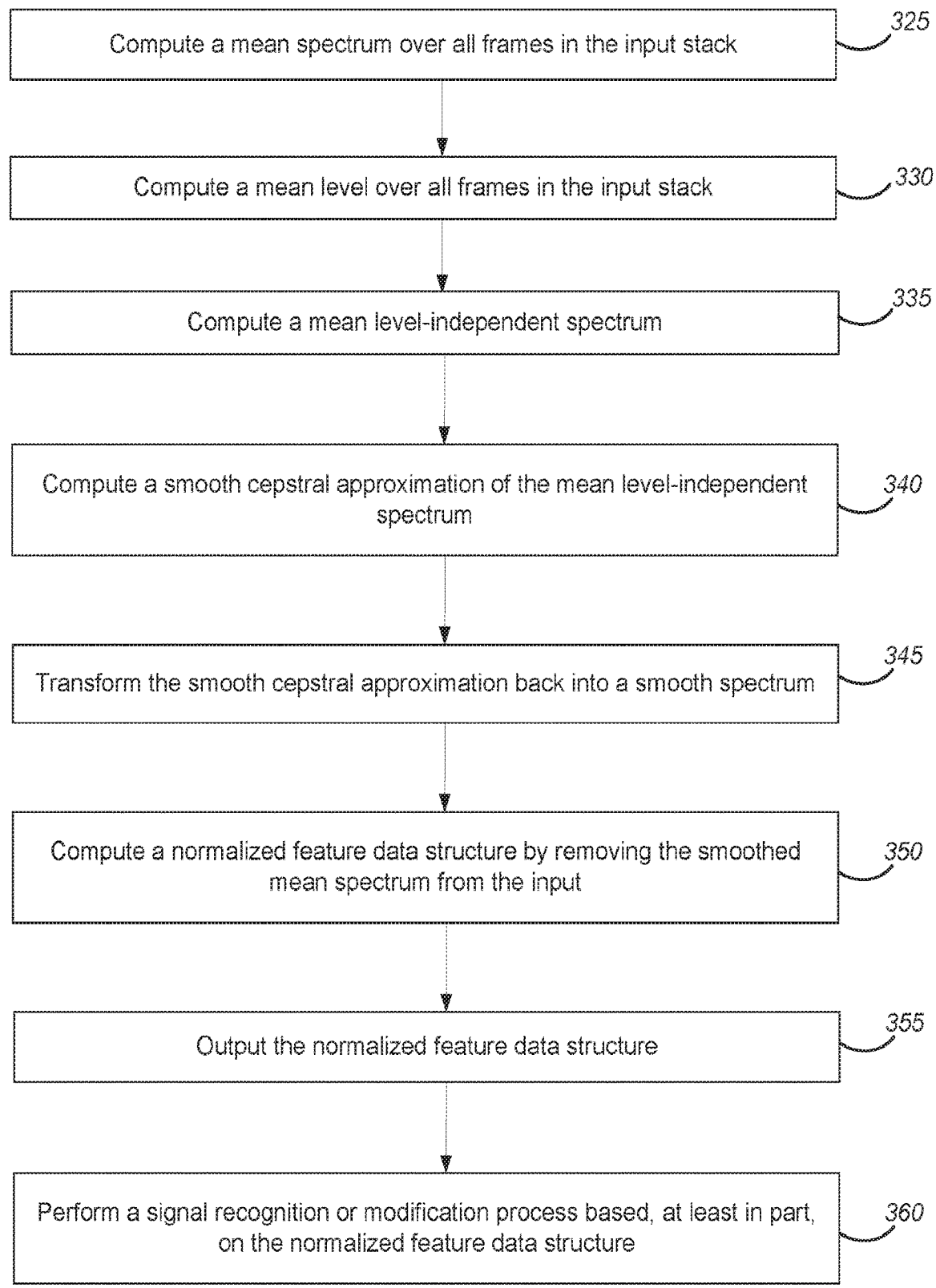
FIG. 3B is a flow diagram that outlines one example of a method that may be performed by an apparatus such as that shown in FIG. 1.

FIG. 3B is a flow diagram that outlines one example of a method that may be performed by an apparatus such as that shown in FIG. 1. The blocks of method 320, like other methods described herein, are not necessarily performed in the order indicated. Moreover, such methods may include more or fewer blocks than shown and/or described.

In this example, blocks 325 through 355 of method 320 are examples of blocks that may be performed by the normalization block 309 of FIG. 3A. According to this example, block 325 involves computing a mean spectrum over all frames of an input stack. The input stack may, for example, be the array 308 of FIG. 3A. According to some examples, block 325 may involve computing the mean spectrum as follows:

$$\mu[f] = \frac{1}{T}\sum_{t=1}^{T} x[f,t] \qquad \text{(Equation 200)}$$

In Equation 200, x[f,t] represents an un-normalized input feature of the array 308 at a particular time t (in the range [1,T], where the index 1 corresponds to the most recent data) in the past and a particular frequency band f (in the range [1,F]). In Equation 200, µ represents the mean spectrum averaged over all frames [1,T].

According to this example, block 330 involves computing a mean level over all frames in the input stack. In this example, block 330 involves taking the mean of the spectrum over all frequencies, e.g., as follows:

$$L = \frac{1}{F}\sum_{f=1}^{F}\mu[f] \qquad \text{(Equation 201)}$$

In Equation 201, L represents the mean broadband level. However, L may be computed in other ways. In some implementations, L may be computed directly from x by substituting Equation 200 into Equation 201 and forming a double sum. For example, some implementations that involve using MATLAB or Julia may set L equal to the mean of x.

In this example, block 335 involves computing a mean level-independent spectrum. According to some examples, block 335 may involve computing the mean level-independent spectrum as follows:

$$\bar{\mu}[f] = \mu[f] - L \qquad \text{(Equation 202)}$$

In Equation 202, $\bar{\mu}$ represents the mean level-independent spectrum averaged over all frames [1,T].

In the example shown in FIG. 3B, block 340 involves computing a smooth cepstral approximation of the mean level-independent spectrum. In some examples, block 340 involves computing a smooth cepstral approximation for a small number of cepstral "dnabs." Note that we use the term cepstrum herein to mean a discrete cosine transform of the logmelspec data. It is common to reverse the characters in part of the word in order to come up with a cepstral term that corresponds to a spectral term. For example, filtering implemented in the cepstral domain is commonly known as "liftering". Therefore, we herein term the cepstral equivalent of a spectral band a "dnab."

The cepstral components except for the one corresponding to the flat basis function (usually, this means excluding the first cepstral component) may be taken as a set of cepstral output components (e.g., the cepstral features 310B of FIG. 3A) that summarize the general spectral shape of the audio data in the stack in a format that is convenient for a speech recognizer to use.

According to some examples, block 340 may involve computing the smooth cepstral approximation as follows:

$$c[b] = \Sigma_{f=1}^{F} C[b,f] \bar{\mu}[f] \quad \text{(Equation 203)}$$

In Equation 203, c[b] represents a cepstral decomposition of $\bar{\mu}$. In some examples, the cepstral decomposition of $\bar{\mu}$ may be obtained by taking the truncated Discrete Cosine Transform (DCT) of $\bar{\mu}$ with respect to the DCT basis matrix C[b,f] for each of the cepstral dnabs b=[1 . . . B]. However, other implementations may apply a different decorrelating transform, such as a Karhunen—Loève Transform (KLT) or a Discrete Sine Transform (DCT) of $\bar{\mu}$. Accordingly, any suitable basis matrix may be involved. The KLT may be an advantageous decorrelating transform for implementations in which the statistics of the particular audio data are known, whereas the DCT may be an advantageous decorrelating transform for implementations in which the statistics of the particular audio data are unknown. In some implementations, B is a single-digit integer, e.g., 2, 3, 4, 5, etc. In this example, OA for b>1 (that is, excluding the first cepstral dnab) are an example of the cepstral features 310B of FIG. 3A. The DCT basis matrix C[b,f] may, for example, be computed according to Equations 206 and 207, below.

In the example shown in FIG. 3B, block 345 involves transforming the smooth cepstral approximation of block 340 back into a smooth spectrum, e.g., as follows:

$$s[f] = \Sigma_{b=1}^{B} S[f,b] c[b] \quad \text{(Equation 204)}$$

In Equation 204, s[f] represents the spectral re-synthesis of c[b] obtained by taking the truncated Inverse Discrete Cosine Transform (IDCT) of c with respect to the IDCT basis matrix S[f,b] In Equation 204, S[f,b] represents an IDCT basis that may be computed by taking the Moore-Penrose pseudoinverse of C[b,f].

Instead of using cepstral analysis and spectral re-synthesis to smooth $\bar{\mu}[f]$, a different smoothing operation may be applied to $\bar{\mu}[f]$ to obtain a smoothed mean spectrum s[f].

In the example of FIG. 3B, block 350 involves computing a normalized feature data structure by removing the smoothed mean spectrum from the input, e.g., as follows:

$$y[f,t] = x[f,t] - L - s[f] \quad \text{(Equation 205)}$$

In Equation 205, WM represents the normalized output features, which are examples of the array 310A of FIG. 3A. The DCT basis matrix C[b,f] may be computed according to Equations 206 and 207:

$$C_1[b+1, f] = \cos\left(\frac{b\pi(f-1)}{F}\right) \text{ for } b = 1 \ldots B, f = 1 \ldots F \quad \text{(Equation 206)}$$

$$C[b, f] = \frac{C1[b, f]}{\sum_{f'} (C1[b, f'])^2} \quad \text{(Equation 207)}$$

The examples of Equations 206 and 207 involve using a DCT-I basis. As noted above, other examples may involve using another type of basis, such as a different type of DCT basis, a DST basis or a KLT basis. The scale factor introduced in Equation 207 is a convenient way of making the cepstral decorrelated dnabs have roughly the same scale as the input band energies.

Some alternative implementations involve a library that supplies an efficient DCT function to implement equation 203 and avoid computing or storing a matrix C. Similarly, in some alternative examples Equation 204 may be replaced by a call to an IDCT function. However, in some such implementations these types of libraries would compute as many cepstral dnabs as there are spectral bands, because they may assume B=F. It may be relatively more desirable to retain a relatively small number of cepstral dnabs. In other words, Equation 204 produces a smoothed spectrum because B<<F.

Alternatively, the normalized feature data structure is computed by removing the mean spectrum $\bar{\mu}[f]$ from the input:

$$y[f,t] = x[f,t] - \mu[f] \quad \text{(Equation 205 a)}$$

In such implementation, a cepstral decomposition of $\mu[f]$ may be determined (instead of cepstral decomposition of $\bar{\mu}[f]$):

$$c[b] = \Sigma_{f=1}^{F} C[b,f] \mu[f] \quad \text{(Equation203a)},$$

to obtain the set of cepstral coefficients c[b] for use in the signal recognition or modification process.

Optionally, in such implementations $\mu[f]$ may be smoothed by a suitable smoothing operation such that Equation 205a comprises subtracting a smoothed version of $\mu[f]$ from the un-normalized feature history data structure x[f,t], and Equation 203a comprises determining a cepstral decomposition of the smoothed version of $\mu[f]$.

In a further alternative, the normalized feature data structure is computed according to Equation 205a, while the set of cepstral coefficients is calculated according to Equation 203. In a further alternative, the normalized feature data structure is computed according to Equation 205, while the set of cepstral coefficients is calculated according to Equation 203a.

According to some alternative implementations, the mean across time ($\mu$) and the mean across time and frequency (L) can both be taken as weighted means if a confidence weighting w[f,t] is available for each input feature x[f,t]. Such implementations can potentially provide added robustness in noisy conditions.

The confidence weighting may be based on a number of different factors, depending on the particular implementation. According to some implementations, the confidence weighting may be based, at least in part, on a stationary noise estimation. A stationary noise estimation may, for example, be obtained by using a minimum follower in each frequency band. In some such examples, for each input frame, if an input band energy is lower than the current noise floor estimate of the frequency band, then the noise floor estimate may be immediately updated to a new energy level (or may be aggressively slewed closer to the new energy level value). According to some such implementations, if an input band is greater than the noise floor estimate, the current estimate noise floor estimate may be very slowly slewed towards the new energy level value. It may be advantageous to track not just the minimum noise, but also to track the variance of the noise in each band and/or to track the covariance of noise between bands.

In some examples, after a stationary noise estimate has been made, it may be assumed that a particular time-frequency tile is unlikely to be relevant to a given speech analytics and/or speech modification task if the stationary noise estimate is close to the noise floor (low estimated SNR), so w may be set close to zero for such bands. On the other hand, if a time frequency tile is more than a threshold amount above the noise floor (high estimated SNR), the time frequency tile is highly likely to be relevant, so in some examples the value of w may be set to near 1 for that band. Some examples may implement this feature by using a logistic function as the mapping between SNR and confidence w.

According to some implementations, the confidence weighting may be based, at least in part, on acoustic echo estimation. For example, if a device includes one or more speakers in addition to one or more microphones, the device (or another device) may predict how the speakers acoustically couple to the microphones over time by observing both signals. Such predictions or determinations may usually be made in the context of echo cancellation or suppression. However, when used with some disclosed implementations, acoustic echo predictions or determinations may not necessarily be used to cancel or suppress the echo, but instead merely predict the echo and then provide an indication to a normalization stage disclosed herein to ignore the bands that are highly polluted by echo when normalizing.

In some examples, an echo canceller may cancel approximately 20 dB of echo. That is, the ERLE (Echo Return Enhancement Loss) may be approximately 20 dB. In communication systems the echo cancellation process is often followed by an echo suppression process that operates in the band energy domain and works to actively suppress residual echoes that may remain after the echo cancellation process. Such an echo suppression process usually works by first predicting an SER (signal to echo ratio) for each band in each frame and then determining a suppression gain for the band based on the SER. According to some disclosed implementations, rather than applying a suppression gain, the SER may be used to drive w, e.g., by using a logistic function as described for SNR in the noise suppression case.

According to some implementations, the confidence weighting may be based, at least in part, on sound direction/correlation (when there are multiple microphones). If a time frequency tile contains predominantly coherent plane wave energy (for example, as determined by a spatial covariance estimate) arriving from a direction that is known to correspond to a talker of interest, in some disclosed implementations the corresponding frequency band may be highly weighted when computing the normalisation. If a time frequency tile appears to be coming from a known interfering source or is a mixture of diffuse ambient sounds, in some disclosed implementations the corresponding frequency band may be given a low weight when computing the normalisation.

In some examples, the confidence weighting may be based, at least in part, on the presence or absence of reverberations, e.g., by ignoring reverberations. It should be possible to predict whether certain time frequency tiles are predominantely due to reverb (from a single microphone) rather than direct sound, e.g., by learning the time that it takes for sound to decay in a particular environment. For example, such predictions may be based on an estimation of the RT60 of a particular environment, which is the time, in seconds, it takes sound in a reverberant environment to decay 60 dB in level. If a disclosed implementation has a high confidence in its estimation that a particular band contains direct speech from a talker, the implementation may set w to a value near 1. If a disclosed implementation estimates that a band is more likely to consist of reverberant energy, the implementation may set w to a value near 0.

In some alternative implementations, Equations 200 and 201, above may be replaced with Equations 200A and 201A, respectively:

$$\mu[f] = \frac{\sum_{t=1}^{T} x[f,t]w[f,t]}{\sum_{t=1}^{T} w[f,t]} \quad \text{(Equation 200A)}$$

$$L = \frac{\sum_{f=1}^{F}\sum_{t=1}^{T} x[f,t]w[f,t]}{\sum_{f=1}^{F}\sum_{t=1}^{T} w[f,t]} \quad \text{(Equation 201A)}$$

finite impulse response (FIR)

Equations 200, 200A, 201 and 201A describe processes of averaging over time. These are finite impulse response (FIR) averages. In other words, in order to implement these equations one needs to know x[f,t−T] at frame t. According to some examples described above, a history buffer (e.g., the array 308 of FIG. 3A) may be maintained, in order to retain the data from T frames ago.

In some alternative implementations that involve applying Equations 200A and 201A (or similar equations), instead of using a history buffer a running approximation ("IIR average") of μ is maintained and is updated over time, e.g., as follows:

$$\mu[f,t]=\alpha\mu[f,t-1]+(1-\alpha)x[f,t] \quad \text{(Equation 208)}$$

In Equation 208, α represents a constant. An example value of α is 0.96, but in other examples α may be larger or smaller. Some such implementations may be more computationally efficient than the examples described above with reference to Equations 200 and 201. Moreover, such implementations may optionally be more dependent on recent data than on older data (or vice versa), by adjusting the value of α.

In the example shown in FIG. 3B, block 355 involves outputting the normalized feature data structure, which may be an example of the normalized feature set 310 shown in FIG. 3A. According to this example, block 360 involves performing a signal recognition or modification process based, at least in part, on the normalized feature data structure. In some such examples, block 360 may involve inputting the normalized feature data structure to an acoustic model, such as one of the acoustic models referenced herein (e.g., the acoustic model 311 of FIG. 3A. According to some implementations, block 360 may involve one or more of the processes that are described above with reference to block 235 of FIG. 2.

Following is an example of implementing, via Julia 1.0, the normalization block 309:

```
using LinearAlgebra
function initialise_basis(::Type{X}, nstack::Int, nband::Int) where {X<:Real}
    c = zeros(X, 3, nband)
    c[1, :] .= X(1)
    for b = 1:(size(c,1)-1)
        c[b+1,:] .= cos.(b*pi * (0:(size(c,2)-1)) / size(c,2))
    end
    c ./= sqrt.(sum(c.^2; dims=2))
    c, pinv(c)
end
function normalise(x::Matrix{X}, C::Matrix{X}, S::Matrix{X}) where {X<:Real]
    mu = mean(x; dims=2)[:]
    L = mean(mu)
    mubar = mu .- L
    c = C * mubar
    s = S * c
    y = x .- L .- s
    [c[2:end]; y[:]]
end
C, S = initialise_basis(Float32, 10, 25)
x = read_feature_stack( )
y = normalise(x, C, S)
```

Figure 4:
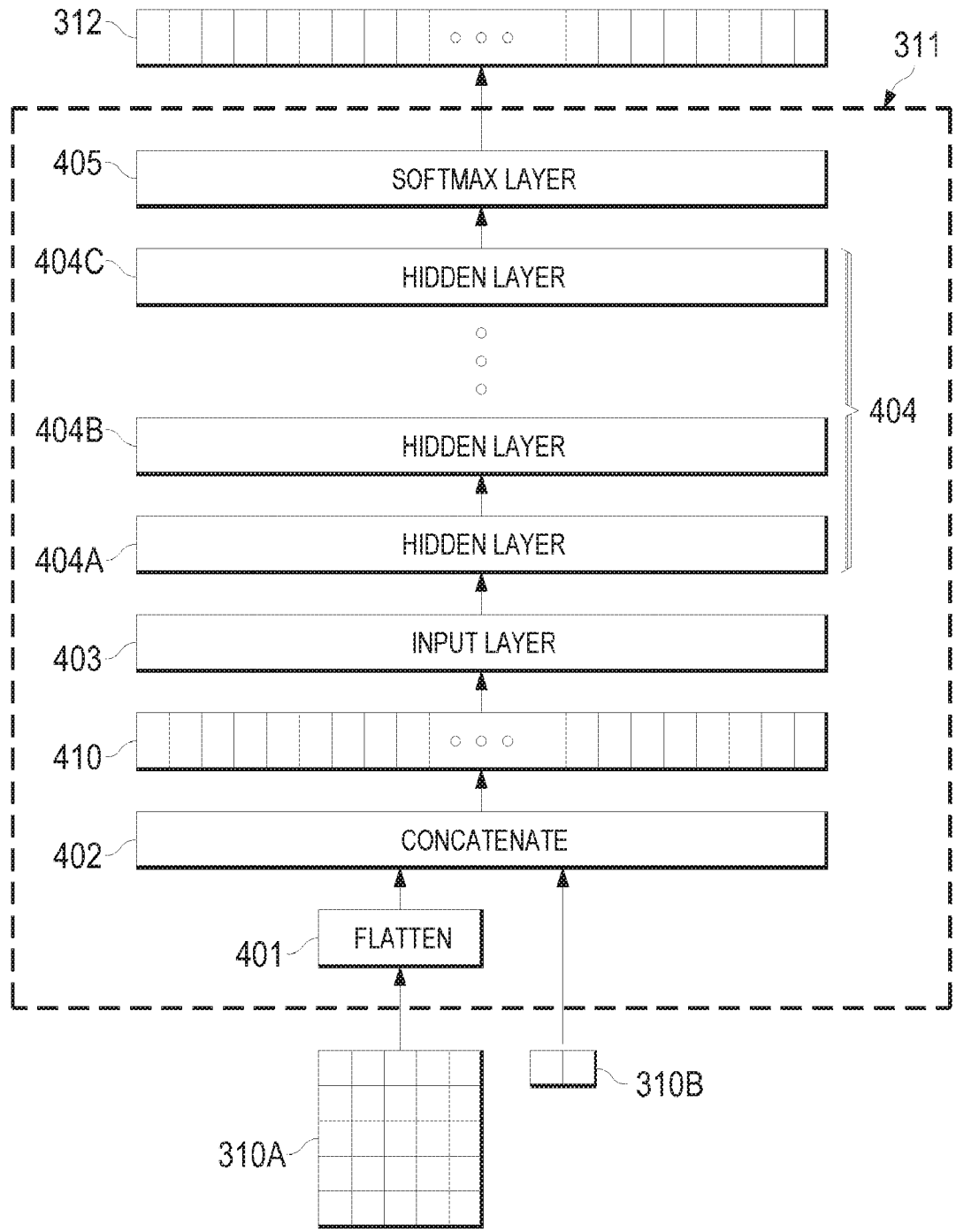
FIG. 4 shows an example of architecture for implementing the acoustic model of FIG. 3A.

FIG. 4 shows an example of architecture for implementing the acoustic model of FIG. 3A. In this implementation, the acoustic model 311 is implemented according to one example of a DNN.

In this example, the normalized feature set 310 is provided to the acoustic model 311. According to this implementation, the array 310A of the normalized feature set 310 is provided to flattening block 401. According to this example, the flattening block 401 is configured to flatten the stack of spectral features 310A into a one-dimensional vector. In some examples, the flattening block 401 may be configured to flatten the stack of spectral features 310A by reading across the rows of the stack of spectral features 310A, whereas in other examples the flattening block 401 may be configured to flatten the stack of spectral features 310A by reading down the columns of the stack of spectral features 310A. In alternative implementations, the flattening block 401 may be configured to flatten the stack of spectral features 310A by reading the stack of spectral features 310A in another manner, e.g., along diagonals.

According to this example, the flattened spectral feature vector output by the flattening block 401 is provided to the concatenation block 402. In this example, the cepstral features 310B are provided directly to the concatenation block 402, because the cepstral features 310B do not require flattening. In this implementation, the concatenation block 402 is configured to combine the flattened spectral feature vector and the cepstral feature vector together to form a single unified feature vector 410. In some implementations, the cepstral features come first followed by the flattened spectral feature vector, whereas in other implementations the flattened spectral feature vector may come first. In other implementations, the flattened spectral feature vector and the cepstral features may be interleaved.

In this example, the concatenation block 402 is configured to output the single unified feature vector 410 to input layer 403 of the DNN. The input layer 403 may, for example, be a fully-connected (a.k.a. dense) layer with biases and a non-linear activation function (e.g., logistic, tanh, rectified linear unit (ReLU), LeakyReLU). The input layer 403 may, for example, produce between 64 and 1024 output values.

According to this example, the DNN includes a plurality of hidden layers 404. In some implementations, the DNN may include between 2 and 6 hidden layers, whereas in other implementations the DNN may include more hidden layers. Each of the hidden layers 404 may, for example, be a fully-connected (a.k.a. dense) layer with biases and a non-linear activation function (e.g., logistic, tanh, rectified linear unit (ReLU), LeakyReLU). Each of the hidden layers 404 may, for example, produce between 64 and 1024 output values.

In this implementation, the output layer 405 produces a probability vector (312) that the input feature set 310 corresponds to each of a number of senone (e.g., phone, biphone, triphone) classes. For example one output might correspond to the user uttering the sound "oo" as in "book."

Some embodiments include a system or device configured (e.g., programmed) to perform one or more disclosed methods, and a tangible computer readable medium (e.g., a disc) which stores code for implementing the one or more disclosed methods or steps thereof. For example, the system may be or may include a programmable general purpose processor, digital signal processor, or microprocessor, programmed with software or firmware and/or otherwise configured to perform any of a variety of operations on data, including an embodiment of a disclosed method or steps thereof. Such a general purpose processor may be or include a computer system including an input device, a memory, and a processing subsystem that is programmed (and/or otherwise configured) to perform an embodiment of a disclosed method (or steps thereof) in response to data asserted thereto.

Some embodiments of a disclosed system may be implemented as a configurable (e.g., programmable) digital signal processor (DSP) that is configured (e.g., programmed and otherwise configured) to perform required processing on audio signal(s), including performance of an embodiment of a disclosed method. Alternatively, embodiments of a disclosed system (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including an embodiment of a disclosed method. Alternatively, elements of some embodiments of a disclosed system may be implemented as a general purpose processor or DSP configured (e.g., programmed) to perform an embodiment of a disclosed method, and the system also may include other elements (e.g., one or more loudspeakers and/or one or more microphones). A general purpose processor configured to perform an embodiment of a disclosed method may be coupled to an input device (e.g., a mouse and/or a keyboard), a memory, and in some examples to a display device.

Another aspect of the disclosure may be implemented in one or more non-transitory computer-readable media (for example, one or more RAMs, ROMs, discs or other tangible storage media) which store code for performing (e.g., coder executable to perform) any embodiment of a disclosed method or steps thereof.

While specific embodiments and applications of the disclosure have been described herein, it will be apparent to those of ordinary skill in the art that many variations on the embodiments and applications described herein are possible without departing from the scope of this disclosure.

Various aspects of the present invention may be appreciated from the following enumerated example embodiments (EEEs):

EEE 1. An audio processing method, comprising:
  receiving microphone audio data from a microphone system;
  digitizing the microphone audio data to produce digitized microphone audio data;
  framing the digitized microphone audio data to produces frames of digitized microphone audio data;
  extracting a feature vector from each frame of the digitized microphone audio data, the feature vector comprising a power value for each frequency band of a plurality of frequency bands;
  forming a feature history data structure, the feature history data structure comprising a plurality of feature vectors;
  producing a normalized feature set comprising a normalized feature data structure by determining normalized power values for a plurality of frequency bands of each feature vector of the feature history data structure; and
  performing a signal recognition or modification process based, at least in part, on the normalized feature data structure.

EEE 2. The method of EEE 1, wherein the signal recognition or modification process comprises a speech recognition process.

EEE 3. The method of EEE 2, wherein the speech recognition process comprises a wakeword recognition process.

EEE 4. The method of EEE 2 or EEE 3, wherein performing the signal recognition or modification process comprises:
  providing the normalized feature data structure to an acoustic model; and
  determining a phone probability estimate based on output of the acoustic model.

EEE 5. The method of EEE 4, wherein the acoustic model comprises a neural network.

EEE 6. The method of any one of EEEs 1-5, wherein the signal recognition or modification process comprises one or more processes selected from a list of processes consisting of: a speaker recognition process; a language recognition process; an emotion recognition process; a non-speech sound classification process; and a noise suppression process.

EEE 7. The method of any one of EEEs 1-6, wherein the frequency bands have equal, or substantially equal, width in a frequency space.

EEE 8. The method of EEE 7, wherein the frequency space is a Mel-frequency space, a Bark scale or an equivalent rectangular bandwidth scale.

EEE 9. The method of any one of EEEs 1-8, wherein the power value comprises a logarithm of power.

EEE 10. The method of any one of EEEs 1-9, wherein producing the normalized feature data structure involves determining a mean broadband level based on a current frame and a most recent previous frame.

EEE 11. The method of EEE 10, wherein producing the normalized feature data structure involves determining a mean spectrum representation based on the current frame and the most recent previous frame.

EEE 12. The method of any one of EEEs 1-9, wherein producing the normalized feature data structure involves determining a mean broadband level based on all frames of the feature history data structure.

EEE 13. The method of EEE 10, wherein producing the normalized feature data structure involves determining a mean spectrum representation based on all frames of the feature history data structure.

EEE 14. The method of any one of EEEs 1-13, wherein producing the normalized feature data structure involves determining a confidence weighting factor for each feature.

EEE 15. The method of EEE 14, wherein determining the confidence weighting factor is based, at least in part, on one or more of a noise estimation, a signal-to-noise estimation, an echo prediction, a signal-to-echo ratio prediction, a sound direction estimation or a reverberation estimation.

EEE 16. The method of EEE 13, wherein producing the normalized feature set involves obtaining a mean level-independent spectrum representation.

EEE 17. The method of EEE 16, wherein producing the normalized feature set involves performing a cepstral decomposition of the mean level-independent spectrum representation.

EEE 18. The method of EEE 17, wherein performing the cepstral decomposition involves applying a decorrelating transform represented by a basis matrix.

EEE 19. The method of EEE 18, wherein the basis matrix represents one or more of a Discrete Sine Transform basis, a Discrete Cosine Transform basis or a Karhunen-Loève Transform basis.

EEE 20. The method of EEE 13, wherein the normalized feature set further comprises a set of coefficients corresponding to an overall average spectral shape of the normalized feature data structure, the set of coefficients being based at least in part on the cepstral decomposition.

EEE 21. The method of any one of EEEs 1-20, further comprising performing a subsequent task that is based, at least in part, on the signal recognition or modification process, wherein the subsequent task comprises one or more tasks selected from a list of tasks consisting of: controlling a speaker to produce a responsive sound; performing an internet search; initiating a telephone call; sending a text message; sending an email message; and changing a setting of a device.

EEE 22. An apparatus configured to perform the method of any one of EEEs 1-21.

EEE 23. One or more non-transitory media having software recorded thereon, the software including instructions for controlling one or more devices to perform the method of any one of EEEs 1-21.

EEE 24. An apparatus, comprising:
  an interface system configured for receiving microphone audio data from a microphone system; and
  a control system configured for:
    digitizing the microphone audio data to produce digitized microphone audio data;
    framing the digitized microphone audio data to produces frames of digitized microphone audio data;
    extracting a feature vector from each frame of the digitized microphone audio data, the feature vector comprising a power value for each frequency band of a plurality of frequency bands;

forming a feature history data structure, the feature history data structure comprising a plurality of feature vectors;

producing a normalized feature set comprising a normalized feature data structure by determining normalized power values for a plurality of frequency bands of each feature vector of the feature history data structure; and performing a signal recognition or modification process based, at least in part, on the normalized feature data structure.

EEE 25. One or more non-transitory media having software recorded thereon, the software including instructions for controlling one or more devices to perform a method, the method comprising:

receiving microphone audio data from a microphone system;

digitizing the microphone audio data to produce digitized microphone audio data;

framing the digitized microphone audio data to produces frames of digitized microphone audio data;

extracting a feature vector from each frame of the digitized microphone audio data, the feature vector comprising a power value for each frequency band of a plurality of frequency bands;

forming a feature history data structure, the feature history data structure comprising a plurality of feature vectors;

producing a normalized feature set comprising a normalized feature data structure by determining normalized power values for a plurality of frequency bands of each feature vector of the feature history data structure; and performing a signal recognition or modification process based, at least in part, on the normalized feature data structure.

EEE 26. The one or more non-transitory media of EEE 25, wherein the signal recognition or modification process comprises a speech recognition process.

EEE 27. The one or more non-transitory media of EEE 26, wherein the speech recognition process comprises a wakeword recognition process.

The invention claimed is:

1. An audio processing method, comprising:
receiving frames of digitized microphone audio data;
extracting a feature vector from each frame of the digitized microphone audio data, the feature vector comprising a power value for each frequency band of a plurality of frequency bands;
forming a feature history data structure, the feature history data structure comprising a plurality of feature vectors;
producing a normalized feature set comprising a normalized feature data structure by determining normalized power values for a plurality of frequency bands of each feature vector of the feature history data structure; and
performing a signal recognition or modification process based, at least in part, on the normalized feature set,
wherein the normalized feature set further comprises a set of cepstral coefficients descriptive of an overall average spectral shape of the normalized feature data structure.

2. The method of claim 1, further comprising:
determining a mean spectrum representation based on a current frame and at least one previous frame, comprising calculating, for each frequency band of the plurality of frequency bands for which power values are determined to extract the feature vector, an average or weighted average of the power value of the respective frequency band of the current frame and the power value of the respective frequency band of the at least one previous frame; and
determining the set of cepstral coefficients based on the mean spectrum representation,
wherein producing the normalized feature data structure is based on the mean spectrum representation.

3. The method of claim 2, further comprising:
determining a mean broadband level representing an average over all frequency bands of the mean spectrum representation;
determining a mean level-independent spectrum representation by subtracting the mean broadband level from the mean spectrum representation;
determining a cepstral decomposition of the mean level-independent spectrum representation; and
determining the set of cepstral coefficients based on the cepstral decomposition.

4. The method of claim 3, wherein producing the normalized feature data structure comprises:
smoothing the mean level-independent spectrum representation; and
subtracting, from each feature vector of the feature history data structure, a smoothed mean level-independent spectrum representation and the mean broadband level.

5. The method of claim 4, wherein smoothing the mean level-independent spectrum representation comprises performing a spectral re-synthesis of the cepstral decomposition.

6. The method of claim 3, wherein the cepstral decomposition comprises a single digit number of cepstral dnabs and the set of cepstral coefficients corresponds to at least a subset of the cepstral dnabs of the cepstral decomposition.

7. The method of claim 2, further comprising determining a cepstral decomposition of the mean spectrum representation or of a smoothed mean spectrum representation; and
determining the set of cepstral coefficients based on the cepstral decomposition.

8. The method of claim 7, wherein producing the normalized feature data structure comprises:
subtracting, from each feature vector of the feature history data structure, the mean spectrum representation or the smoothed mean spectrum representation.

9. The method of claim 2, wherein the mean spectrum representation is determined as an infinite impulse response, IIR, average based on the current frame and the most recent previous frame.

10. The method of claim 2, wherein the mean spectrum representation is determined as a finite impulse response, FIR, average based on all frames of the feature history data structure by calculating, for each frequency band of the plurality of frequency bands for which power values are determined to extract the feature vector, a mean of power values of the respective frequency band of all frames of the feature history data structure.

11. The method of claim 1, wherein the signal recognition or modification process comprises a speech recognition process.

12. The method of claim 11, wherein the speech recognition process comprises a wakeword recognition process.

13. The method of claim 11, wherein performing the signal recognition or modification process comprises:
providing the normalized feature set to an acoustic model; and
determining a phone probability estimate based on output of the acoustic model.

14. The method of claim 13, wherein the acoustic model comprises a neural network.

15. The method of claim 1, wherein the signal recognition or modification process comprises one or more processes selected from a list of processes consisting of: a speaker recognition process; a language recognition process; an emotion recognition process; a non-speech sound classification process; and a noise suppression process.

16. The method of claim 1, wherein the frequency bands of the plurality of frequency bands for which power values are determined to extract the feature vector have equal, or substantially equal, width in a frequency space.

17. The method of claim 16, wherein the frequency space is a Mel-frequency space, a Bark scale or an equivalent rectangular bandwidth scale.

18. The method of claim 1, wherein the power value comprises a logarithm of power.

19. The method of claim 1, wherein producing the normalized feature data structure involves determining a confidence weighting factor for each feature, wherein determining the confidence weighting factor is based, at least in part, on one or more of a noise estimation, a signal-to-noise estimation, an echo prediction, a signal-to-echo ratio prediction, a sound direction estimation or a reverberation estimation.

20. The method of claim 1, further comprising performing a subsequent task that is based, at least in part, on the signal recognition or modification process, wherein the subsequent task comprises one or more tasks selected from a list of tasks consisting of: controlling a speaker to produce a responsive sound; performing an internet search; initiating a telephone call; sending a text message; sending an email message; and changing a setting of a device.

21. The method of claim 1, further comprising:
receiving microphone audio data from a microphone system;
digitizing the microphone audio data to produce the digitized microphone audio data; and
framing the digitized microphone audio data to produces frames of digitized microphone audio data.

22. One or more non-transitory media having software recorded thereon, the software including instructions for controlling one or more devices to perform the method of claim 1.

23. An apparatus, comprising:
a interface system; and
a control system including one or more processors, the control system configured to:
receive frames of digitized microphone audio data;
extract a feature vector from each frame of the digitized microphone audio data, the feature vector comprising a power value for each frequency band of a plurality of frequency bands;
form a feature history data structure, the feature history data structure comprising a plurality of feature vectors;
produce a normalized feature set comprising a normalized feature data structure by determining normalized power values for a plurality of frequency bands of each feature vector of the feature history data structure; and
perform a signal recognition or modification process based, at least in part, on the normalized feature set, wherein the normalized feature set further comprises a set of cepstral coefficients descriptive of an overall average spectral shape of the normalized feature data structure.

* * * * *